United States Patent [19]
Scudder et al.

[11] Patent Number: 5,809,786
[45] Date of Patent: *Sep. 22, 1998

[54] CONTAINER WITH INTEGRAL MODULE FOR HEATING OR COOLING THE CONTENTS

[75] Inventors: James A. Scudder, San Diego; James L. Berntsen, Ramona, both of Calif.

[73] Assignee: Insta-Heat, Inc., Poway, Calif.

[*] Notice: The term of this patent shall not extend beyond the expiration date of Pat. Nos. 5,461,867 and 5,626,022.

[21] Appl. No.: 813,554

[22] Filed: Mar. 7, 1997

Related U.S. Application Data

[60] Division of Ser. No. 550,457, Oct. 30, 1995, Pat. No. 5,626,022, which is a continuation-in-part of Ser. No. 250,537, May 31, 1994, Pat. No. 5,461,867.

[51] Int. Cl.[6] .................................................. F25D 5/00
[52] U.S. Cl. ........................... 62/4; 62/371; 126/263.01; 126/263.08
[58] Field of Search .................. 62/4, 371, 293; 126/263.01, 263.08

[56] References Cited

U.S. PATENT DOCUMENTS

| | | |
|---|---|---|
| 2,288,895 | 7/1942 | Fink . |
| 2,327,447 | 8/1943 | O'Brien . |
| 2,850,006 | 9/1958 | Karpalo . |
| 3,815,867 | 6/1974 | Rein et al. .............................. 251/61.2 |
| 3,970,068 | 7/1976 | Sato . |
| 4,741,324 | 5/1988 | Ina et al. . |
| 4,784,678 | 11/1988 | Rudick et al. . |
| 4,793,323 | 12/1988 | Guida et al. . |
| 5,088,870 | 2/1992 | Fukuhara et al. . |
| 5,169,524 | 12/1992 | Meiritz et al. .......................... 210/232 |
| 5,255,812 | 10/1993 | Hsu . |
| 5,461,867 | 10/1995 | Scudder et al. ............................... 62/4 |
| 5,626,022 | 5/1997 | Scudder et al. ............................... 62/4 |

FOREIGN PATENT DOCUMENTS

| | | |
|---|---|---|
| 0255494 | 2/1988 | European Pat. Off. . |
| 2659940 | 9/1991 | France . |
| 356576 | 10/1961 | Switzerland . |
| 2131542 | 6/1984 | United Kingdom . |
| 9317928 | 9/1993 | WIPO . |

*Primary Examiner*—William Doerrler
*Attorney, Agent, or Firm*—Brown, Martin, Haller & McClain

[57] ABSTRACT

A container having a container body, a thermic module at one end of the body, and a closure at the other end, heats or cools its contents by initiating a chemical reaction inside the thermic module when a user activates the container. The thermic module may include a module cap and a module body. Two reactants, such as calcium oxide and water, are retained in portions of the thermic module and separated by a barrier that is punctured when a user activates the container, thus allowing them to mix. The cap may have vent channels between surfaces of the module cap and the module body that allow gases to vent, yet prevent escape of unsightly solid particles. A filter ring may be included in the path of each vent channel to further prevent such escape. The solid reactant may be contained in a porous bag in the thermic module to still further minimize leakage of particles. The container body may have double-walled construction, with a vacuum space between the inner and outer walls to slow heat transfer after the contents have reached the intended temperature. To facilitate use of the container, the container body may include instructions that can be read by a user when the container is inverted.

7 Claims, 7 Drawing Sheets

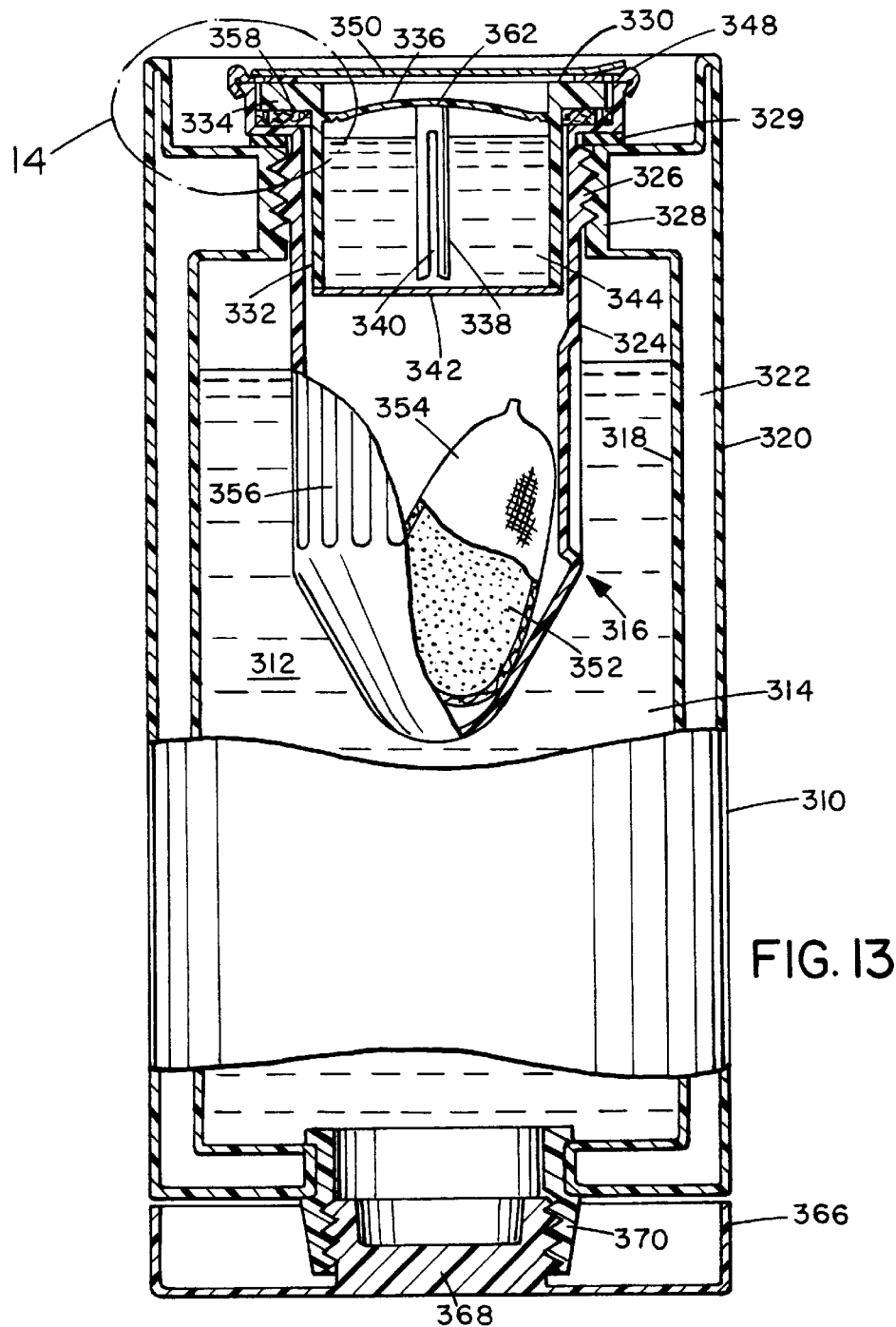
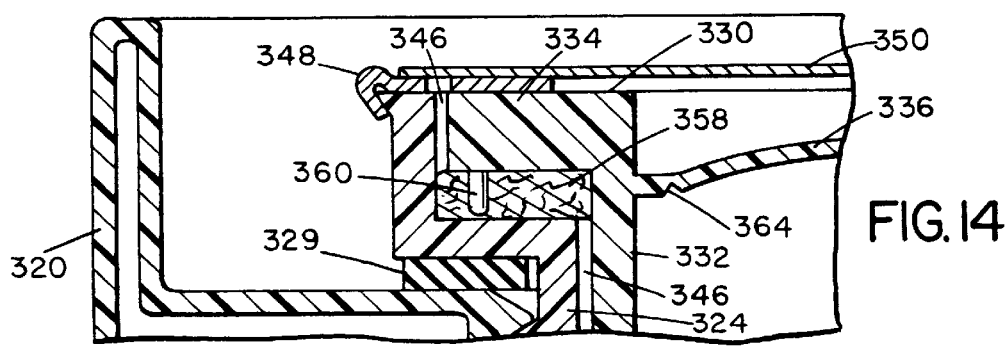
FIG. 13
FIG. 14

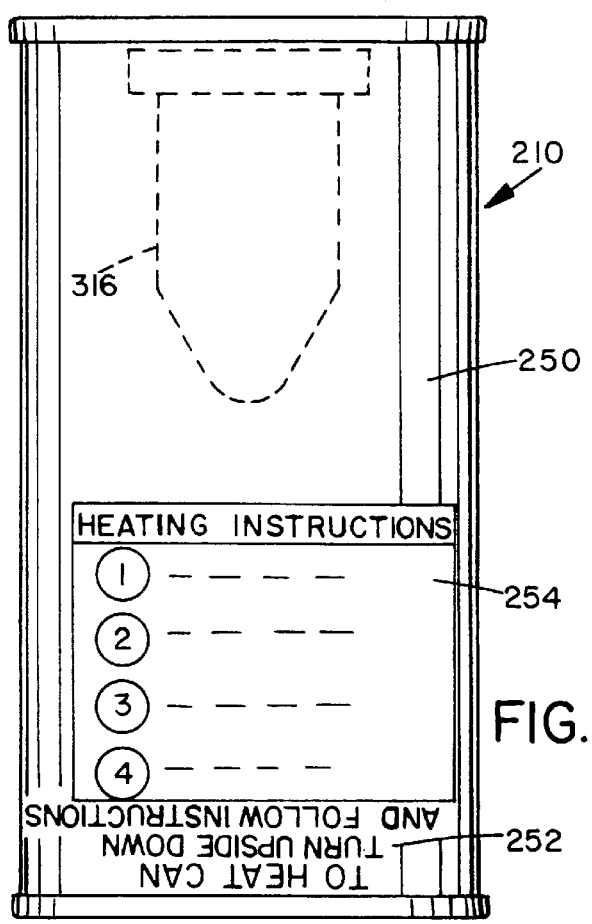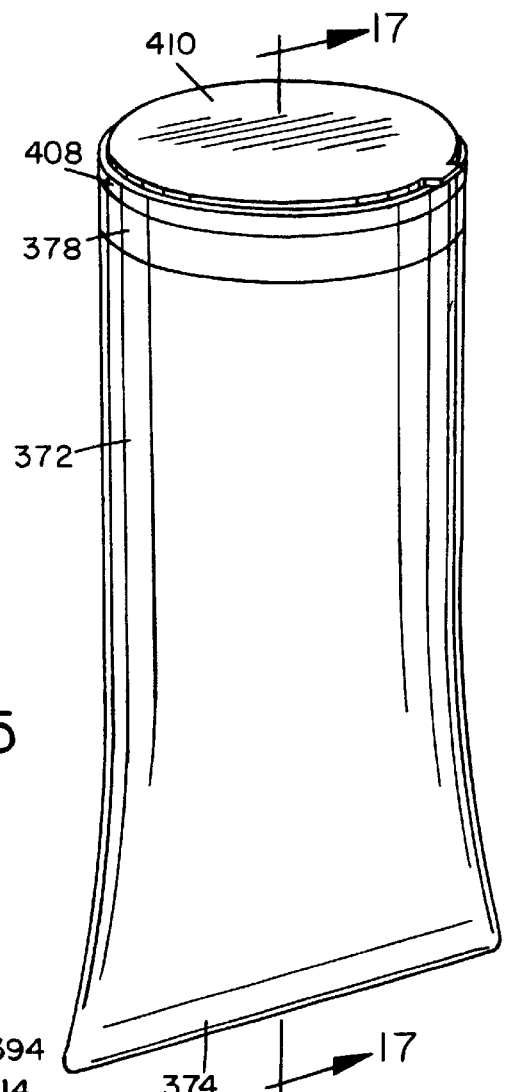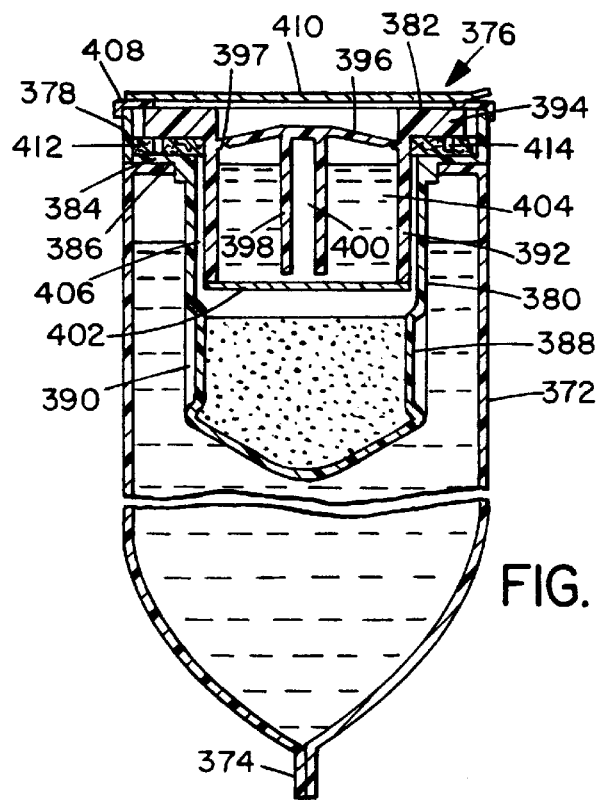

CONTAINER WITH INTEGRAL MODULE FOR HEATING OR COOLING THE CONTENTS

CROSS-REFERENCE TO RELATED APPLICATION

This is a Continuation-in-Part of application Ser. No. 08/550,457, filed Oct. 30, 1995, now U.S. Pat. No. 5,626,022, which is a Continuation-in-Part of application Ser. No. 08/250,537, filed May 31, 1994, now U.S. Pat. No. 5,461,867.

BACKGROUND OF THE INVENTION

The present invention relates generally to containers for heating or cooling materials such as food, beverages, medicines, and the like and, more specifically, to a container that includes an internal module that adds heat to or removes heat from the materials in the surrounding container.

Containers may have integral modules for warming materials in the container, such as Japanese sake, coffee, or soup. Examples of such self-heating containers are disclosed in U.S. Pat. No. 4,640,264, issued to Yamaguchi et al., and U.S. Pat. No. 4,784,113, issued to Nagai et al. Such containers typically include an outer can or body, in which the food or beverage is sealed, and an inner can or module that contains two chemical reactants. The reactants are stable when separated from one another but, when mixed, produce an exothermic reaction. It is known that combinations of other reactants will produce endothermic reactions to cool the container contents.

The inner can is typically disposed adjacent one end of the container body. The inner can has two chambers, each of which contains one of the chemical reactants, separated by a breakable barrier such as metal foil or a thin plastic film. Typically, one of the reactants is in solution, and the other is in a solid powdered or granular form. A rod extends into the outer can at the end adjacent the inner can. One end of the rod is adjacent to the barrier, and the other end terminates in a button outside the outer can. To initiate the reaction that warms or cools the contents of the outer can, the can is disposed with that end upright. Depressing the button forces the rod downward, breaking the barrier and allowing the liquid reactant to drop into the solid reactant. The end of the rod may have a flared head to facilitate complete puncturing of the barrier. The heat produced by the resulting exothermic reaction or used by the resulting endothermic reaction is transferred between the inner can and the contents of the outer can by conduction. Exothermic reactions also typically generate a gas, which is allowed to escape through vents in the end of the container. When the reaction has stopped, the container is inverted. The second end of the outer can has a seal, such as pull-tab, that may be opened and through which the user may consume the heated contents.

Self-heating and self-cooling containers known in the art are uneconomical to manufacture because the mechanism for puncturing the foil barrier commonly has multiple components. The inner can contains the solid reactant and has a short, tubular cap sealing one end. The cap contains the liquid reactant. One end of the cap is sealed with the foil barrier, and the rod extends through an opening in the other end of the cap. Depressing the button forces the rod to slide in the opening until it punctures the foil barrier. Practitioners in the art have found that forcing a rod through the foil opens a large passage through which the liquid reactant can flow, thereby minimizing the time required for the liquid to drain from the cap into the remainder of the inner can. However, fabricating and assembling the multiple components increases the cost of the container. Furthermore, liquid can leak between the rod and the opening in the cap through which the rod moves. Practitioners in the art have therefore disposed a ring of wax around the rod where it exits the inner can to improve sealing. The step of adding the wax, however, increases the manufacturing complexity and, ultimately, cost of the container. Self-heating and self-cooling containers known in the art may also leak the powdery material that is the product of the completed reaction through the vents when the container is inverted.

The inner can may be unitarily formed with the outer can, as illustrated, for example, in U.S. Pat. No. 3,970,068, issued to Sato, and U.S. Pat. No. 5,088,870, issued to Fukuhara et al. The unitary container body is formed by providing a metal cylinder that is open at one end and closed at the other, and punching or deep-drawing a cavity in the closed end. A cap containing the liquid reactant is attached to the open end of the cavity.

After a self-heating container has been activated and the contents heated or cooled, heat transfer through the container wall rapidly equalizes the temperature of the contents with the environmental temperature. Thus, a heated beverage, for example, may cool undesirably before the user consumes it.

It would desirable for a user to know the length of time after activation the contents of a self-heating container will have reached a certain temperature. For example, it may be desirable to assure a user that a container having coffer will have reached 150 degrees Fahrenheit three minutes after activating the container. Nevertheless, the time between activation of a self-heating or self-cooling container and the onset of the chemical reaction is typically inconsistent, varying from container to container by seconds or even minutes due to variations in the composition of the reactants and the conditions under which they were manufactured. For example, it is known that the characteristics of quicklime (calcium oxide) may vary from manufacturer to manufacturer and even from batch to batch depending on moisture and temperature of the environment in which the quicklime is manufactured. Most commercially available quicklime is manufactured for use in cement for the construction trade. Because building contractors and masons do not need to precisely time of the onset of cement curing, manufacturers of calcium oxide typically do not exercise precise control over manufacturing variables such as environmental moisture and temperature.

It would be desirable to provide a self-heating or self-cooling container that has a minimal number of separate parts and can be economically manufactured. It would also be desirable to provide such a container with improved vent sealing to prevent leakage of powdery reaction products. It would further be desirable to provide such a container that begins the reaction at a consistent time after activation and that maintains its contents at the desired temperature for an extended period of time after the reaction is completed. These problems and deficiencies are clearly felt in the art and are solved by the present invention in the manner described below.

SUMMARY OF THE INVENTION

The present invention relates to a container having a container body, a thermic module at one end of the body, and a closure at the other end of the body. The body may have any suitable generally tubular shape, such as cylindrical or bottle-shaped. The food, beverage, medicine or other material to be heated or cooled is contained in a material cavity in the container body. A first reactant is contained in a portion of the thermic module. A second reactant is contained in another portion of the thermic module that extends into the material cavity of the container body. A breakable barrier inside the thermic module separates the two reactants. Although these reactants may be included in any compounds or mixtures known in the art, the first reactant is preferably a solid and the second reactant is preferably a liquid that produce an exothermic or endothermic reaction upon mixing. Mixing of the reactants, which may comprise any suitable chemical compounds or mixtures, produces an exothermic or endothermic chemical reaction, depending upon the reactants selected. To create an exothermic reaction, one reactant may be calcium oxide, and the other reactant may be water. The calcium oxide may be in granular or powdered form.

In certain embodiments, the thermic module may comprise two separate elements: a module cap and a module body. The module cap seals an open end of the module body and retains the first reactant in the module body. In certain embodiments, the breakable barrier may seal an open end of the module cap and retain the second reactant in the module cap. Nevertheless, the breakable barrier may be disposed in any suitable location in the thermic module.

In other embodiments, a portion of the thermic module may be unitarily formed with the container body to define a two-cavity unitarily formed container body. For example, the container body may include the material cavity and a unitarily formed reactant cavity. The first reactant may be retained in the reactant cavity. The thermic module may include a module cap. The second reactant may be retained in the module cap, which has an end sealed by the breakable barrier. Thus, a portion of such a thermic module is defined by the reactant cavity, and another portion is defined by the module cap.

The module cap includes an actuator that a user depresses to activate the container. An elongated member having one or more prongs extends toward the barrier from the module cap. Prior to actuation, the elongated member is in a retracted position. In response to the force applied to the actuator by the user, the prong or prongs move in an axial direction, i.e., toward the barrier, thereby puncturing it and allowing the first and second materials to mix. After removing finger pressure from the flexible member, it may snap or lock into the depressed or extended position with the prongs extended or it may resiliently resume the retracted position.

The actuator may have any suitable shape. For example, it may include a flexible member such as a circular disc. The flexible member may be made of a semi-rigid material such as plastic or an elastomeric material such as rubber. In embodiments in which the flexible member is made of a semi-rigid material, the flexible member may have a living hinge unitarily formed in its periphery to facilitate flexure.

The cap may have one or more vent channels between surfaces of the module cap and the module body that contact one another when the module cap is connected to the module body. The channels allow gaseous products of a reaction to escape but inhibit leakage of solids.

After the reaction in the self-heating or self-cooling container is started, the user may invert the container. The gaseous reaction products escape through the vent channels. After the reaction is completed, the user may remove a closure, such as a pull tab, to access the contents for consumption. Despite the then-inverted orientation of the container, the channels minimize leakage of solid reaction products. (The liquid reactant does not leak because it is used up in the reaction or absorbed by the solids.)

To further minimize leakage of solids, the container may include a filter ring between the module body and the module cap. The filter ring thus blocks a portion of each vent channel. The filter ring is made of a suitable material that allows gaseous products to escape but blocks solid particles.

In certain embodiments, the solid reactant may be contained in a porous bag to minimize leakage of particles.

In accordance with still another feature of the invention, the container body may have double-walled construction, with a vacuum space between the inner and outer walls. After the container is activated, the vacuum insulates the container and prevents heat transfer between the external environment and the materials in the container that have been heated or cooled. Thus, heated materials remain hot, and cooled materials remain cooled. The container may be reused by replacing the thermic module. The thermic module may be removable from the container to facilitate replacement by a threaded screw connection or other suitable connection.

To facilitate use of the container, the container body may include instructions that can be read by a user when the container is oriented with the end having the thermic module vertically above the end having the closure. In other words, the instructions are inverted with respect to the orientation of the container in which a user would consume the contents through the closure.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 13 is a side elevational view of another alternative container, partially cut-away;

FIG. 14 is an enlarged view of a portion of FIG. 13;

FIG. 15 is a side elevational view of the exterior of the container, showing the inverted instructions printed thereon;

FIG. 16 is a perspective view of still another alternative container; and

FIG. 17 is a sectional view taken on line 17—17 of FIG. 16.

DESCRIPTION OF PREFERRED EMBODIMENTS

Figure 6:
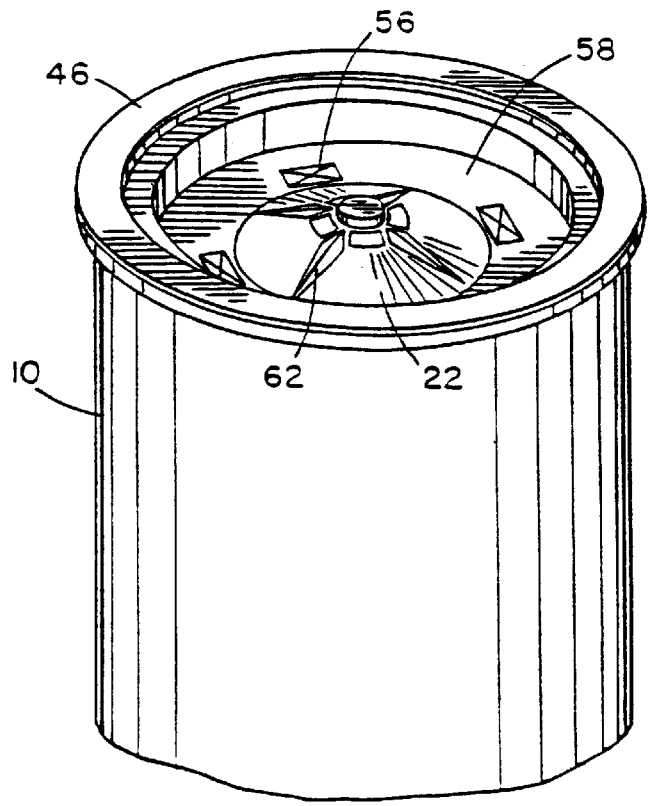
FIG. 6 is a partial perspective view of the container of FIGS. 1–5.

As illustrated in FIGS. 1–4, a container comprises a cylindrical container body 10, which may contain a beverage 12, and a thermic module 14 for heating beverage 12. Thermic module 14 seals one end of container body 10, and an endcap 15 with a pull-tab closure 16 of the type commonly used to seal beverage cans seals the other end. An exterior view of the end of the container at which thermic module 14 is disposed is shown in FIG. 6. When the container is actuated, as described below, thermic module 14 generates heat, which is transferred by conduction to beverage 12. The container may then be inverted and pull-tab closure 16 opened to allow beverage 12 to be consumed.

Thermic module 14 comprises a cylindrical module body 18 and a cylindrical module cap 20. Module cap 20 is of unitary construction and is made of a semi-rigid plastic, such as high density polyethylene. Module cap 20 has an actuator disc 22 and four prongs 24. A breakable barrier 34 made of metal foil is adhesively attached to module cap 20. Barrier 34 seals water 36 inside module cap 20. Module body 18 contains a solid chemical 38 such as calcium oxide, commonly known as quicklime. An annular cap channel 40 receives the lip 42 of module body 18, thereby sealing solid chemical 38 inside. Cap channel 40 may have crushable dimples 44 that improve sealing. Module body 18 is preferably made of a metal, such as aluminum.

As mentioned above, the container is sealed at both ends. Sealing ring 46 secures thermic module 14 in container body 10. Sealing ring 46 has a ring channel 48 that receives the hook-like lip 50 of container body 10. Sealing ring 46 is crimped over lip 50 to form a tight seal. At the opposite end of the container, endcap 15 has a similar endcap channel 51 that receives the opposite lip 53 of container body 10. Endcap 15 is crimped over the opposite lip 53 of container body 10 in a similar manner. A sealing compound (not shown) of the type commonly used in the can industry may be disposed in ring channel 48 to further improve sealing. Thermic module 14 is press-fit in the opening of sealing ring 46. The portion of thermic module 14 that contacts sealing ring 46 may have crushable dimples 52 to further improve sealing.

To actuate the container, a safety seal 54, which is adhesively attached to thermic module 14, must be removed or broken. Safety seal 54 minimizes the possibility of tampering or inadvertent actuation of the container. Although safety seal 54 may be plastic, foil, paper or other suitable films, it is preferably transparent to allow viewing of actuator disc 22. The container may also have an outer lid 55 made of plastic that snaps over the end of container body 10. Outer lid 55 not only further reduces the likelihood of inadvertent actuation, but can also be used to retain condiments such as a packet of sugar (not shown) or a promotional item such as a coupon (not shown) between it and safety seal 54. Lid 55 may be transparent.

Figure 5:
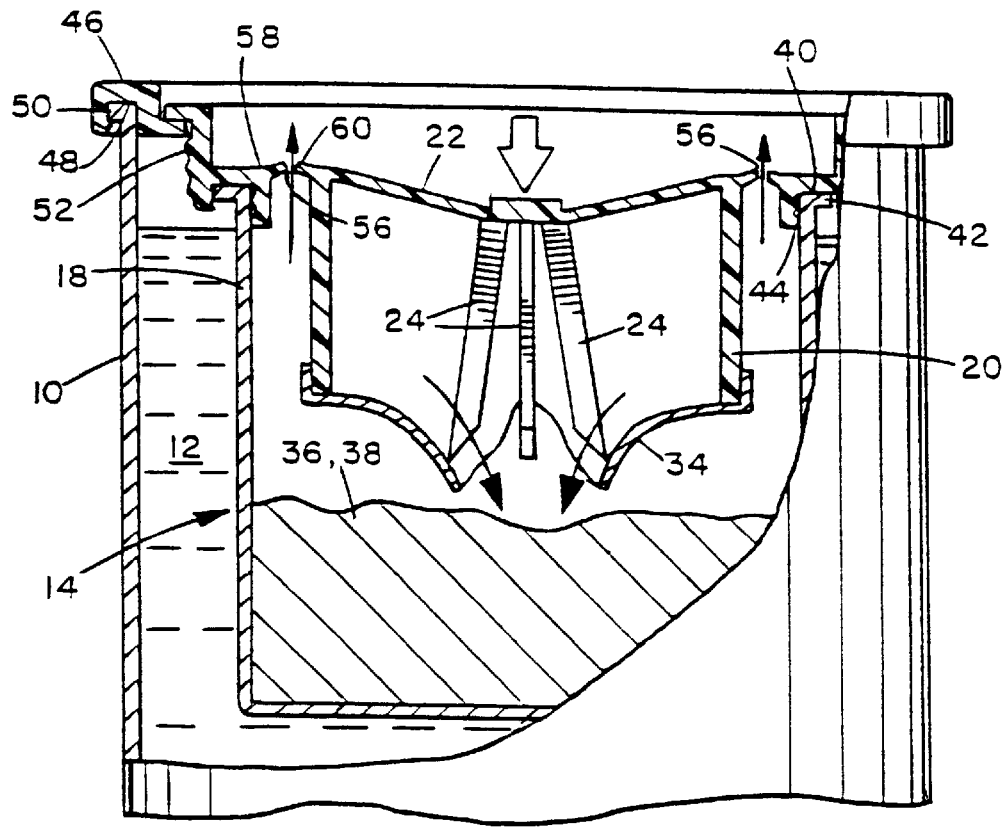
FIG. 5 is an enlarged view similar to FIG. 1, showing actuation of the container.

As illustrated in FIG. 5, when an axially directed force is applied at or near the center of actuator disc 22, it flexes toward barrier 34. The distal ends of prongs 24 both move axially and spread apart radially to facilitate complete puncturing of barrier 34. Water 36 flows through the punctured barrier 34 and mixes with solid chemical 38. The resulting exothermic reaction produces heat, which is transferred to beverage 12 by conduction through module body 18, and carbon dioxide, which escapes through four vents 56 that are distributed around an annular lip 58 between module body 18 and module cap 20.

Figure 3:
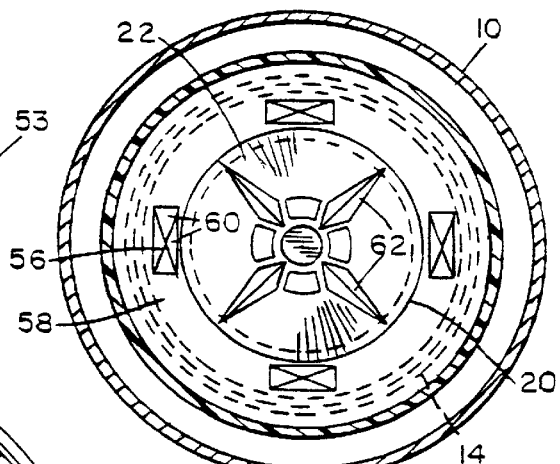
FIG. 3 is a sectional view taken along line 3—3 of FIG. 1.
Figure 4:
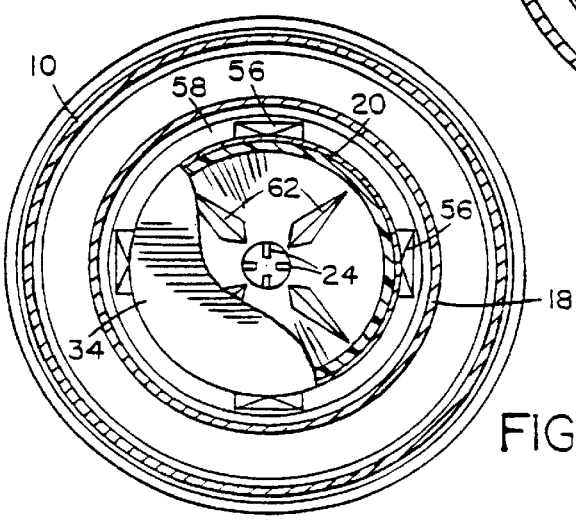
FIG. 4 is a sectional view taken along line 4—4 of FIG. 1.
Figure 7:
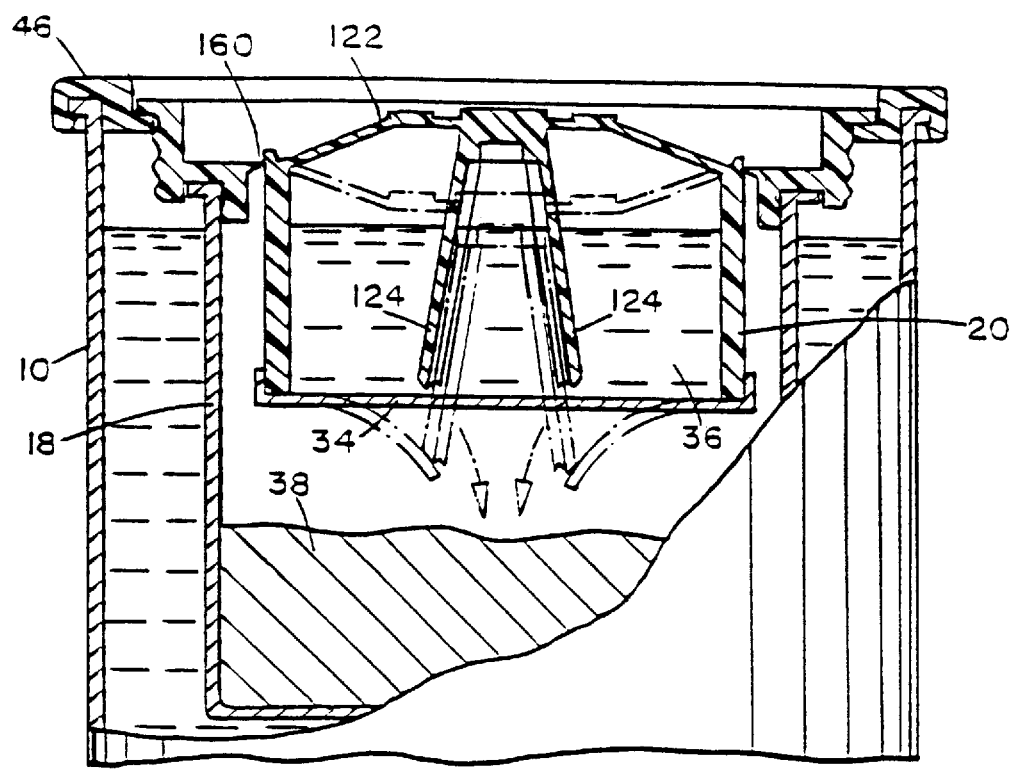
FIG. 7 is an enlarged view similar to FIG. 5, showing an alternative construction of the module cap.
Figure 8:
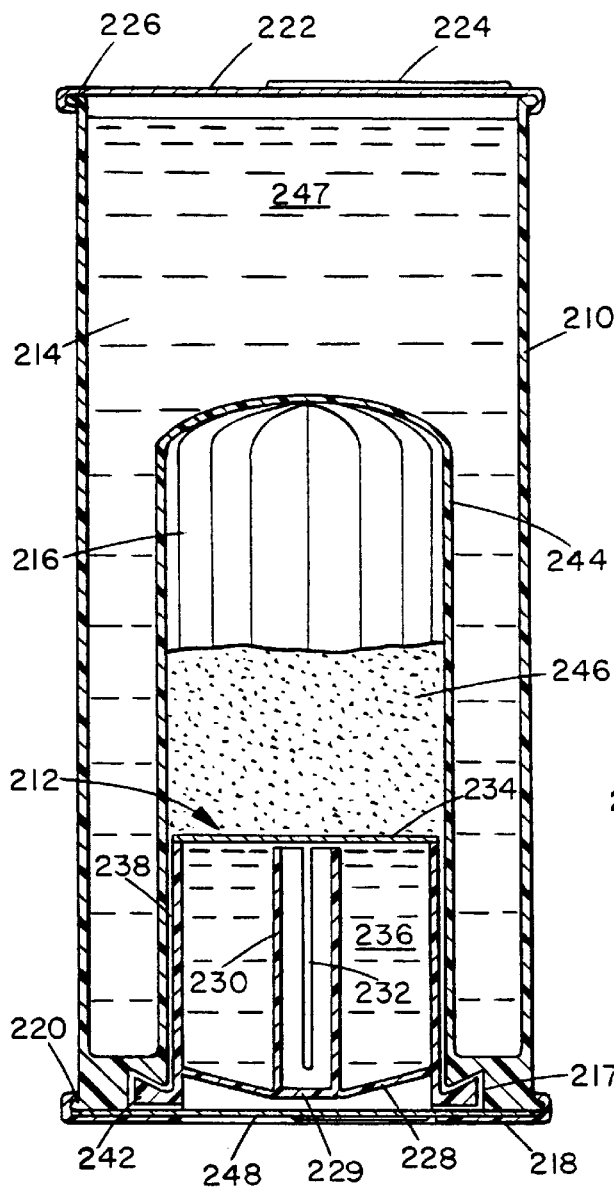
FIG. 8 is a view similar to FIG. 1, showing an alternative container.
Figure 9:
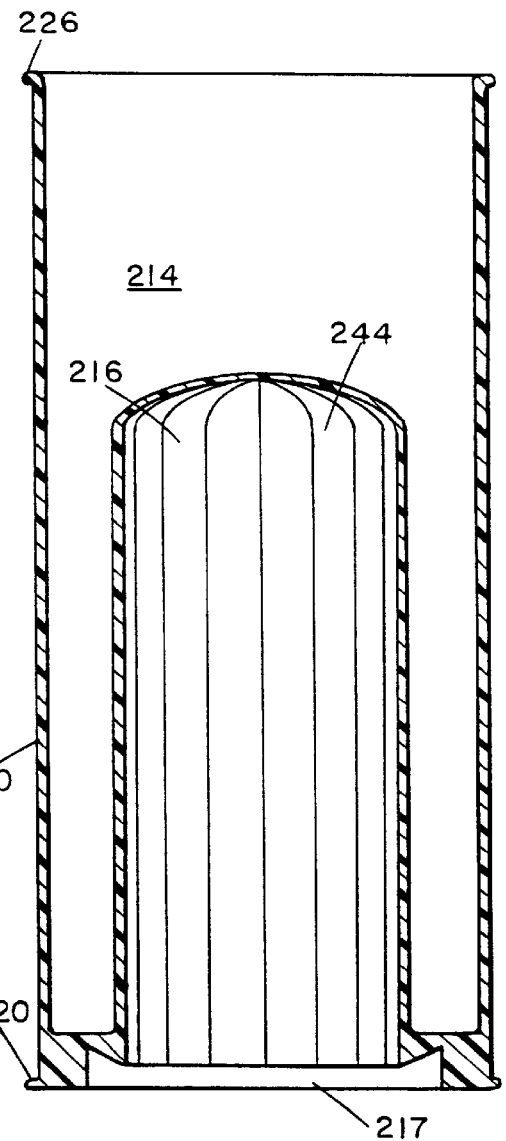
FIG. 9 is a sectional view of the container body by itself.
Figure 10:
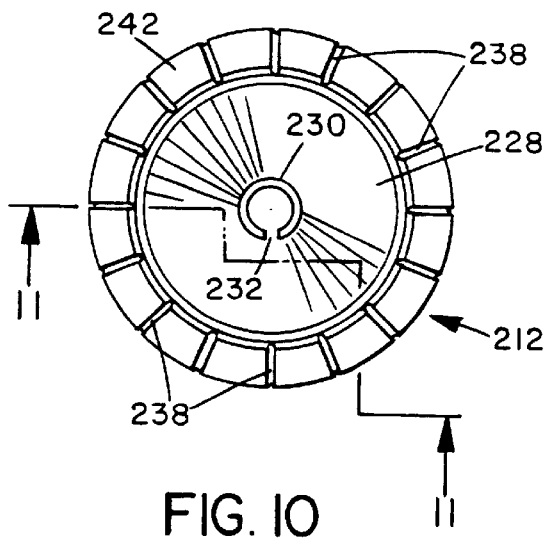
FIG. 10 is a top plan view of the cap.
Figure 11:
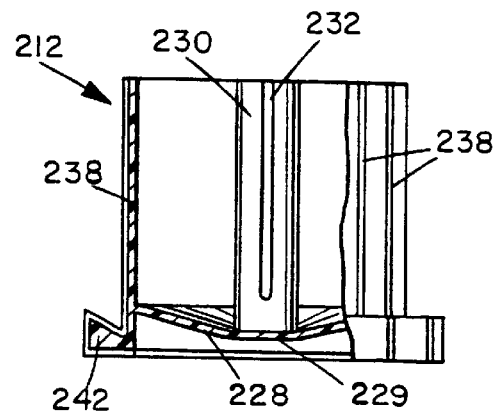
FIG. 11 is a sectional view taken on line 11—11 of FIG. 10.

As best illustrated in FIGS. 3 and 4, vents 56 may comprise four flexible triangular flaps 60, which are in contact with one another when the pressures inside and outside module 14 are equal, but which spread apart to release the gas produced by the reaction. Alternatively, as illustrated in the embodiment shown in FIG. 7, a vent may be formed by a single flap 160.

Figure 1:
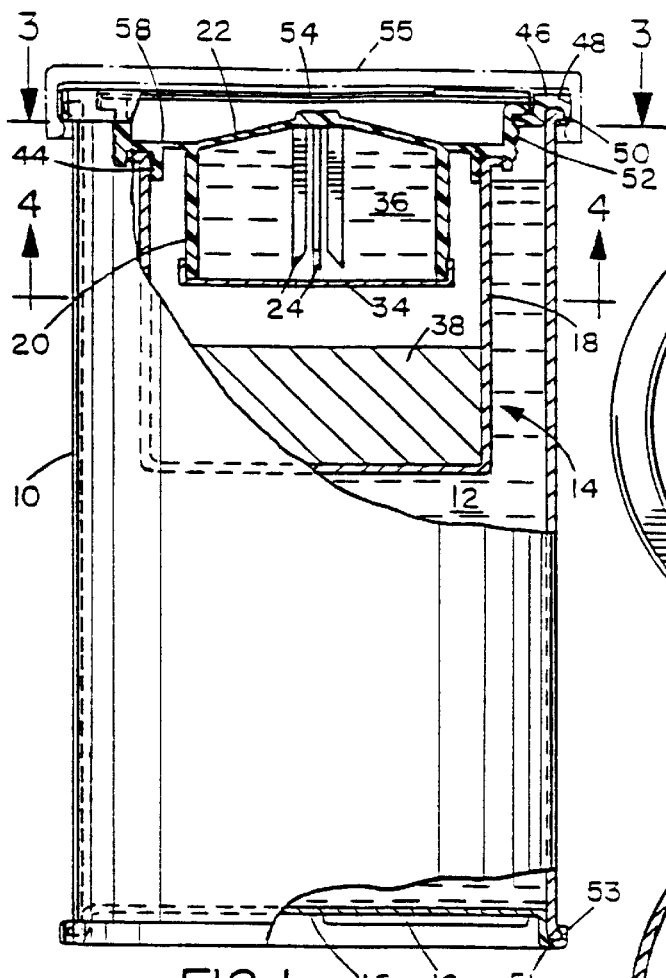
FIG. 1 is a side elevational view of the container, partially cut-away.
Figure 2:
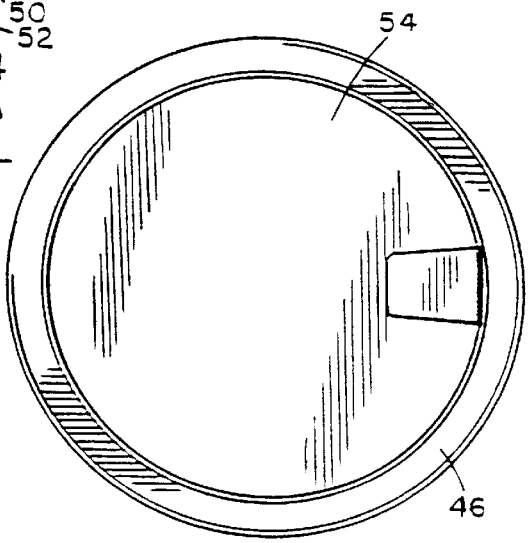
FIG. 2 is a plan view of the container.

In the retracted position of actuator disc 22, i.e., before the container is actuated, actuator disc 22 may appear convex or dome-shaped when viewed from the outside of the container, as shown in FIGS. 1 and 6. In its extended position, i.e., after the container has been actuated, actuator disc 22 may appear concave or dished, as shown in FIG. 5. Actuator disc 22 is preferably stable in both the extended and retracted positions, and "snaps" into the extended position when the container is actuated. The snapping action provides a positive visual and tactile indication to the user that the container has been actuated. At least a portion of actuator disc 22 must flex during the transition between the retracted and extended positions. In the illustrative embodiments, four radial folds 62 facilitate this transition by reducing the amount of force required to flex actuator disc 22. However, in other embodiments, actuator disc 22 may have more, fewer, or no radial folds 62.

Prongs 24 are distributed around the center of actuator disc 22 at the same radial distance. Prongs 24 may be formed by cutting lengthwise a tubular cylinder that is integrally molded in module cap 20. The resulting prongs 24 have sector-shaped cross-sections. Although in the illustrated embodiments, module cap 20 has prongs 24 distributed about the center of actuator disc 22, in other embodiments module cap 20 may have only a single central prong.

Furthermore, the portions of actuator disc 22 that flex when the container is actuated may be at any radial distance from the central axis and may have any suitable shape. They may be concentrated at one or more substantially discrete radial distances or may be continuous over all radial distances. In the embodiment illustrated in FIGS. 1–6, portions of actuator disc 22 that are between prongs 24 are flexible, thereby causing prongs 24 to spread apart radially when the container is actuated. In the alternative embodiment illustrated in FIG. 7, however, the portions of the alternative actuator disc 122 that flex are at greater radial distances than the prongs 124. The flat central portion of actuator disc 122 where prongs 124 are disposed does not flex. Therefore, prongs 124 do not spread apart radially when the container is actuated. Although prongs 124 preferably have a slight radial cant with respect to the central axis of the container, prongs 124 remain in that orientation regardless of whether actuator disc 122 is in the extended or retracted position. Such an embodiment facilitates injection molding because the areas of flexure are not adjacent to prongs 124.

Container body 10 may be made of any suitable material, such as cardboard, metal or plastic. A cardboard body 10 resists heat conduction and will thus not be uncomfortable for a user to hold after actuating the container. However, it is known in the art that solid chemical 38 and water 36 can be replaced with suitable combinations of chemicals for producing an endothermic reaction, which would cool beverage 12. In embodiments that cool a carbonated beverage, container body 10 should be made of metal or plastic because such materials would facilitate the formation of gas-tight seals.

As illustrated in FIGS. 8–12, an alternative embodiment of the container comprises a container body 210 and a cap 212. Rather than assembling a thermic module in container body 210, as in the embodiment described above, in the present embodiment a portion of container body 210 and a portion of cap 212 in combination perform the heating or cooling function. The resulting container can be manufactured more economically because fewer separate parts, seals and assembly steps are necessary, and because plastic is used extensively in the construction.

Container body 210 is preferably made of injection-molded food-grade plastic and includes a material cavity 214 unitarily formed with a reactant cavity 216. Nevertheless, in other embodiments, two or more plastic pieces may be sonically welded, adhesively joined, or joined by other suitable, sanitary methods to form a container body. Cap 212 is fit in the open end 217 of reactant cavity 216 and is preferably retained by a ring 218 that is crimped over the lip 220 at one end of container body 210. Nevertheless, as noted below, cap 212 may alternatively be sonically welded or adhesively joined to container body 210 because both elements are made of plastic. An endcap 222 with a pull-tab closure 224 of the type commonly used in beverage cans is crimped over the lip 220 at the other end of container body 210.

Cap 212 is of unitary construction and is made of a semi-rigid plastic, such as high density polyethylene. Cap 212 has an actuator disc 228 and a cylindrical prong 230 with an elongated notch 232. A breakable barrier 234 made of metal foil is adhesively attached to the open end of cap 212 to seal water 236 inside.

Cap 212 has multiple vent channels 238 distributed around its outside surface. When cap 212 is fit in the open end of reactant cavity 216, each of vent channels 238 preferably provides a cross-sectional area through which gas can escape of no more than between about 0.0002 and 0.001 square inches. Because vent channels 238 are not shown to scale in FIGS. 10 and 11 for purposes of clarity, it should be noted that this cross-sectional area is quite small, comparable to the inside diameter of a capillary tube. Because this cross-sectional area is thus relatively small in comparison to the predominant granule size of the solid reactant and reaction product tends to aggregate into, a large amount of these solids is unlikely to enter vent channels 238. Nevertheless, some portion of these solids may disintegrate into finer particles and even fine powder. It is in part for this reason that cap 212 has at least about eight vent channels 238. The relatively small cross-sectional area of each vent channel 238 minimizes the probability that the larger solid particles will enter, while the relatively large number of channels 238 minimizes the probability that any significant number of channels 238 will become plugged with the finer, powdery particles. If any vent channels 238 become plugged, gas will be released through the remaining vent channels 238. Vent channels 238 extend longitudinally along the outside surface of the cap body 240, change direction to extend radially along the lower surface of the flange 242 of cap 212, change direction again to extend longitudinally along the outside cylindrical surface of flange 242, and change direction again to extend radially along the upper surface of flange 242. It should be noted that the lower surface of flange 242 is not oriented perpendicularly with respect to the outside surface of cap body 240, but rather at an acute angle of about 45–55 degrees, resulting in a portion of vent channel 238 that is zig-zag or "Z"-shaped. This zig-zag shape of channels 238 functions as a baffle to inhibit the escape of very fine or powdery solid particles that may be small enough to enter channels 238 but too large to become lodged in them and plug them.

Although in the illustrated embodiment ring 218 retains cap 212 in container body 210, because cap 212 and container body 210 are both made of plastic, they may alternatively be sonically welded or adhesively joined. It should be noted that the plastic construction of cap 212 and container body 210 is an important feature of the invention; metal, cardboard and other materials conventionally used in self-heating and self-cooling containers would not be as suitable as plastic. Plastic facilitates construction of a sanitary container, without the need for special seals or coatings of the type used in conventional metal containers. Sonically welding or adhesively joining plastic elements creates joints that are gas-tight and sanitary. Maintaining a gas-tight seal is important in containers that are used to cool carbonated beverages. Moreover, the complex, dual-cavity shape of container body 210 defined by material cavity 214 and reactant cavity 216 is more economical to form in plastic than in metal.

The inner portion of container body 210 defining reactant cavity 216 has a corrugated or pleated wall 244 to increase surface area and, as a result, heat transfer. Cap 212 seals a solid reactant 246, such as calcium oxide, inside reactant cavity 216.

Material cavity 214 may be used to contain a beverage 247, food, medicine, or other material. As described above with respect to other embodiments, beverage 247 is heated or cooled (depending on the reactants used) when the user actuates the container. As noted above, although this embodiment may be used to either heat or cool the material, it is particularly advantageous for cooling due to its plastic construction. It is also particularly advantageous for cooling carbonated beverages because the carbon dioxide dissolved in beverage 247 cannot escape from open end 217 of container 210.

Figure 12:
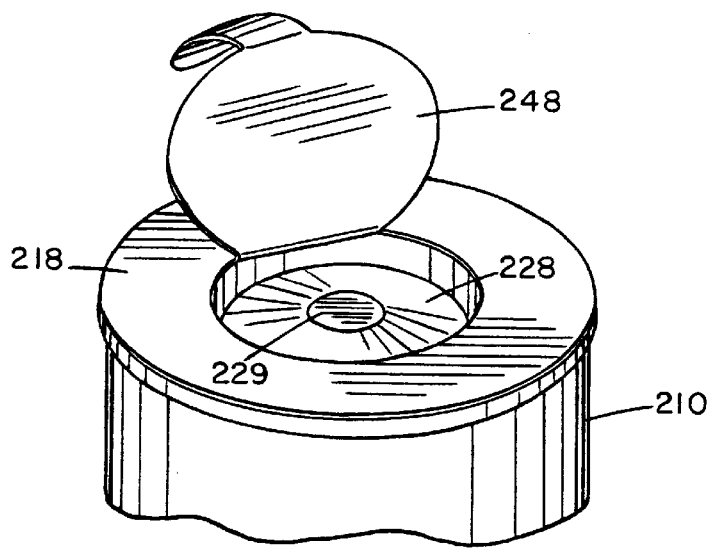
FIG. 12 is a perspective view of the lower end of the container, with the seal opened to expose the actuator disc.

To actuate the container, the user must peel off a safety seal 248, as illustrated in FIG. 12. Safety seal 248 preferably comprises a peelable metal foil with a tab that a user can grip. The periphery of safety seal 248 is crimped under ring 218. A score line separates the central portion of safety seal 248 and allows a user to separate it from the peripheral area. As illustrated in FIG. 12, when a longitudinally or axially directed force is applied at or near the center 229 of actuator disc 228 it flexes toward barrier 234. The distal end of prong 230 punctures barrier 234. Water 236 flows through the punctured barrier 234 and mixes with solid reactant 246. Notch 232 in prong 230 facilitates the flow of water 236 into reactant cavity 216, because water 236 can flow into the hollow interior of prong 230 on one side of barrier 234 and out of prong 230 on the other side of barrier 234. The resulting exothermic reaction produces heat, which is transferred to beverage 247 by conduction through pleated wall 244. Gas produced in the reaction escapes through vent channels 238.

When the reaction is complete, the container may be inverted and pull-tab closure 224 opened to allow beverage 247 to be consumed. In self-heating containers known in the art, when the container is inverted the solid reaction product that remains in reactant cavity 216 tends to escape through the slot-like vents that are used in such conventional containers. While the solid reaction product is not harmful, the sight of it escaping from the container is discomforting to a user and detracts from the marketability of such containers.

In the present invention, however, inverting the container does not allow solid reaction product to escape because, even if a small amount enters vent channels 238, the zig-zag shape of vent channels 238 impedes its progress.

To facilitate use, the container preferably includes instructions printed or otherwise suitably displayed on the outside of container body 210. As illustrated in FIG. 15, container body 210 includes a label 250 having first and second portions 252 and 254, respectively, on which are printed textual instructions. When container body 210 is oriented vertically with pull-tab closure 224 uppermost, the instructions on first portion 252 is oriented in the position in which a person would normally read text. In this position, the instructions on second portion 254 appear inverted to the user. When container body 210 is inverted and cap 212 uppermost, the instructions on second portion 254 is oriented in the position in which a person would normally read text. In this position, the instructions on first portion 252 appear inverted to the user. The instructions printed on first portion 252 direct the user to invert the can and follow instructions printed on second portion 254. The instructions printed on second portion 254 direct the user to actuate the container as described above, and may also direct the user to wait a specified time interval before consuming the contents. Although the instructions are preferably textual, symbolic instructions or any other type of indicia having an orientation in which they are normally viewed by a user and another orientation in which they appear inverted to a user would also be suitable.

As illustrated in FIGS. 13 and 14, another alternative embodiment of the container comprises a container body 310 having a material cavity 312, which for illustrative purposes is shown containing a beverage 314, and a thermic module 316 for heating beverage 314. Container body 310 has inner and outer walls 318 and 320, respectively, the space 322 between which is essentially evacuated of air. The vacuum insulates beverage 314 against heat conduction with the outside environment in the manner that conventional vacuum bottles, such as those sold under the THERMOS brand, insulate the materials stored within them.

Thermic module 316 is removable. Thus, after thermic module 316 has been activated and beverage 314 consumed, it can be removed and replaced. Thus, the container can be reused by replacing thermic module 316. To facilitate removal, thermic module 316 includes a module body 324 with a threaded module body portion 326. Container body 310 has a threaded container body portion 328 that is mateable with threaded module body portion 326. An annular gasket 329 between thermic module 316 and container body 310 inhibits leakage of beverage 314.

Thermic module 316 also includes a module cap 330. Module cap 330 is of unitary construction and is made of a semi-rigid plastic, such as high density polyethylene. Module cap 330 includes a cylindrical portion 332 and a flange 334. Module cap 330 also include an actuator disc 336 and a cylindrical prong 338 with an elongated notch 340, as in the embodiment described above with respect to FIGS. 8–12. A breakable barrier 342 made of metal foil is adhesively attached to the open end of module cap 330 to seal water 344 inside.

As in the embodiment described above with respect to FIGS. 8–12, module cap 330 has multiple vent channels 346 distributed around its outside surface. Each of vent channels 346 functions as an escape conduit for gas produced by the reaction, because the gas is channeled between the outside surface of module cap 330 and the inside surface of module body 324 when they are connected. As in the above-described embodiment, each of vent channels 346 preferably provides a cross-sectional area through which gas can escape of no more than between about 0.0002 and 0.001 square inches. Vent channels 346 extend longitudinally along the outside surface of cylindrical portion 332 of module cap 330, change direction to extend radially along the lower surface of flange 334, and change direction again to extend longitudinally along the outside cylindrical surface of flange 334, and change direction again to extend radially along the upper surface of flange 334.

A ring 348 is crimped onto the rim of module body 324 to retain module cap 330 in its open end. A safety seal 350 is adhered to ring 348. Safety seal 350 preferably comprises a peelable metal foil with a tab that a user can grip.

Module body 324 defines a reactant cavity for containing a solid reactant 352 such as calcium oxide. Solid reactant 352 is contained in a packet or bag 354 made of a suitable porous or fibrous material such as paper or cloth or a fine synthetic mesh. Bag 354 further prevents particles of solid reactant 352 from escaping through vent channels 346. Module cap 330 seals the reactant cavity when it is retained in the open end of module body 324 as described above. As in the embodiment described above with respect to FIGS. 8–12, module body 324 has a corrugated or pleated wall 356 to increase surface area and, as a result, heat transfer.

A filter ring 358 is disposed between the lower surface of flange 334 of module cap 330 and the upper surface of a corresponding step in the open end of module body 324. Filter ring 358 further prevents solid particles from escaping through vent channels 346 while allowing gases to vent unimpeded. Filter ring 358 may be made of any suitable filter material such as synthetic sponge, open-cell foamed rubber, or any woven or fibrous materials such as paper and cloth. Although in the illustrated embodiment filter ring 358 is disposed beneath flange 334 of module cap 330, in other embodiments it may be disposed in contact with any suitable portion of vent channels 346 between module body 324 and module cap 330 that suitably interferes with the communication of such particles through vent channels 346.

The lower surface of flange 334 has standoff prongs 360 that extend into filter ring 358. The length of standoff prongs 360 is determinitive of the extent to which filter ring 358 is compressed or squeezed when a user presses actuator disk 336. Compressing filter ring 358, like compressing any filter element, reduces the size of its interstices, thereby impeding flow. Standoff prongs 360 promote filtration consistency by substantially preventing deformation of filter ring 358. Standoff prongs 360 are preferably at least three or four in number and are evenly distributed around the circumference of flange 334.

To actuate the container, the user peels off safety seal 350, as described above with respect to other embodiments (see FIG. 12), exposing actuator disk 336. As described above with respect to other embodiments, when a longitudinally or axially directed force is applied at or near the center 362 of actuator disc 336 it flexes toward breakable barrier 342. (See FIG. 7.) Actuator disc 336 has a feature known in the art as a "living hinge" 364 unitarily formed around its circumference. As illustrated more clearly in FIG. 14, living hinge 364 is defined by a V-shaped groove molded into the plastic of actuator disc 336. The shape of the groove and the reduced thickness of the plastic that defines the groove facilitate flexure in a hinge-like manner. The function of living hinge 364 is thus similar to that of radial folds 62 described above with respect to the embodiment illustrated in FIGS. 1–7.

In response to the inward flexure of actuator disc 336, the distal end of prong 340 punctures barrier 342. Water 344 flows through the punctured barrier 342, penetrates bag 354, and mixes with solid reactant 352. As in the embodiment described above with respect to FIGS. 8–12, notch 340 in prong 338 facilitates the flow of water 344 into the reactant cavity. The resulting exothermic reaction produces heat, which is transferred to beverage 312 by conduction through pleated wall 356. Gas produced in the reaction escapes through vent channels 346, but any solid particles are filtered out by filter ring 358.

A suitable material may be added to the reactants to retard the reaction. The duration of a reaction between calcium oxide (quicklime) and water and the amount of heat it produces depends upon the amounts and proportions of calcium oxide and water. Nevertheless, the interval between the time at which the calcium oxide mixes with the water and the time at which heat is produced may vary depending upon the conditions under which the calcium oxide was manufactured. It is believed that moisture in the manufacturing environment can affect this time interval. The retardant can be added to the calcium oxide, water or both in an empirically determined amount necessary to ensure that the reaction begins a predetermined time interval after the container is activated. By ensuring that containers consistently begin the reaction at such a time, and ensuring that the amounts and proportions of quicklime and water are consistent among containers, it can be ensured that the containers consistently heat their contents to a predetermined temperature in a predetermined time interval. Any commercially available retardant of the type known to be usable in the curing of cement and plaster, both of which are principally composed of calcium oxide, would be suitable. Other materials, such as vinegar, are also known retardants and may be suitable. Nevertheless, certain commercially available retardants for the curing of cement and plaster may not be safe for incidental contact with food and thus would be undesirable to use in a container for heating foods and beverages. Vinegar produces an undesirable strong odor when used as a retardant for plaster. Therefore, a preferred retardant that may be added to a reaction of calcium oxide and water is a simple sugar such as ordinary table sugar (sucrose), lactose and glucose. In addition to being economical, such sugars are foods themselves and thus implicitly safe for incidental contact with the contents of the container to be heated. In addition, sugar produces no odor when used as a retardant. The sugar is preferably dissolved in the water, although mixing sugar with the calcium oxide powder may also be suitable.

When the reaction is complete, the user may invert the container and unscrew a cap 366 to allow the user to consume beverage 312. Cap 366 has a projection 368 made of an insulating material, such as plastic, that fits into the neck 370 of the container. Neck 370 is made of an insulating material, such as plastic, that minimizes the likelihood of scalding the user's lips that might otherwise be significant if the user were to drink directly from metal container body 310.

As illustrated in FIGS. 16 and 17, still another alternative embodiment of the container comprises a container body 372 having a tapered, tube-like or pouch-like shape and made of a flexible or pliable material such as soft plastic. Soft metal foil of the type commonly used in toothpaste tubes would also be suitable. This container body material is particularly advantageous for storing materials such as medicines that need to be heated or cooled uniformly throughout their volume because a user can facilitate uniform heating or cooling by gently kneading container body 372 after actuating the container.

A narrow end 374 of container body 372 is sealed in a suitable manner. In the illustrated embodiment, narrow end 374 of a plastic container body 372 is heat-welded to seal it. In an embodiment in which container body 374 is made of metal, the narrow end may be crimped to seal it. A thermic module 376 is disposed in the open end 378 of container body 372. Thermic module 376 includes a module body 380 and a module cap 382. Module body 380, which is preferably made of plastic, has a module flange 384 that is welded or bonded to a corresponding body flange 386. Flanges 384 and 386 facilitate welding because a welding tool can simultaneously contact both flanges 384 and 386.

Module body 380 defines a reactant cavity for containing the solid reactant 388. Module cap 382 seals the reactant cavity when it is retained in the open end of module body 380. Module body 380 has a corrugated or pleated wall 390 to increase surface area.

Module cap 382 is similar to those described above with respect to other embodiments and is thus described only briefly below. It is preferably of unitary construction and made of a semi-rigid plastic. It includes a cylindrical portion 392 and a flange 394. It also includes an actuator disc 396 with a living hinge 397 formed around its circumference. It further includes a cylindrical prong 398 with an elongated notch 400. It also includes a breakable barrier 402 made of metal foil that is adhesively attached to its open end to seal water 404 inside. Module cap 382 has multiple vent channels 406 distributed around its outside surface that channel gas between the outside surface of module cap 382 and the inside surface of module body 380.

A ring 408 crimped onto the rim of module body 380 retains module cap 382. A safety seal 410 that preferably comprises a peelable metal foil is adhered to ring 408.

A filter ring 412 of the same type as described above with respect to the embodiment illustrated in FIGS. 13 and 14 is disposed between the lower surface of flange 394 of module cap 382 and the upper surface of a corresponding step in the open end of module body 380. The lower surface of flange 394 has standoff prongs 414 as described above with respect to FIGS. 13 and 14.

To actuate the container, the user peels off safety seal 410, exposing actuator disc 396. The user presses the center of actuator disc 396, causing it to flex inwardly until the distal end of prong 398 punctures barrier 402. While the contents are changing temperature, the user may gently knead container body 372 to promote even heat distribution throughout the contents. When the contents have reached the desired temperature, the user may open the container by severing container body 372 along a line adjacent to narrow end 374. The user may then pour out the contents. In other embodiments, however, a container having a flexible container body may include a removable closure, such as a screw-cap, at the end opposite the thermic module, through which the user may squeeze the contents to consume them.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A container for selectably changing the temperature of a material by mixing two reactants, comprising:

a container body having a first end and a second end, said container body having a material cavity for containing said material;

a openable closure at said second end of said container body for providing access to said material cavity;

a thermic module disposed at said first end of said container body and comprising a module body and a module cap connected to said module body, said module body for containing a first reactant therein and extending into said material cavity, a connection between said module body and said module cap defining a plurality of vent channels, said module cap including an open end, an actuator, and a breakable barrier, said breakable barrier sealing said open end of said module cap and thereby retaining a second reactant in said module cap, said module cap including an elongated member movable between a retracted position and an extended position in response to a force experienced by a portion of said actuator, a distal end of said elongated member extending beyond said open end of said module cap when said elongated member is in said extended position; and a filter ring disposed in the connection between said module body and said module cap in interfering relation to said vent channels.

2. The container recited in claim 1, wherein:

said container body has a material cavity unitarily formed with a reactant cavity;

said module cap is disposed in an opening in said first end of said container body to retain said first reactant in said reactant cavity of said container body; and said filter ring is disposed between said module cap and said container body at said opening in said first end of said container body.

3. The container recited in claim 2, wherein:

said module cap has a flange, and said container body has a corresponding shoulder at said first end of said container body; and said filter ring is disposed between said flange and said shoulder.

4. The container recited in claim 1, wherein said connection between said module body and said module cap includes a plurality of projections for maintaining a separation between said module body and said module cap.

5. The container recited in claim 1, wherein said filter ring is made of an open-cell foam material.

6. The container recited in claim 1, wherein said filter ring is made of a woven material.

7. The container recited in claim 1, wherein said filter ring is made of a fibrous material.

* * * * *